June 17, 1947.    F. D. BRYANT    2,422,393
ELECTRIC PLUG
Filed Nov. 17, 1945
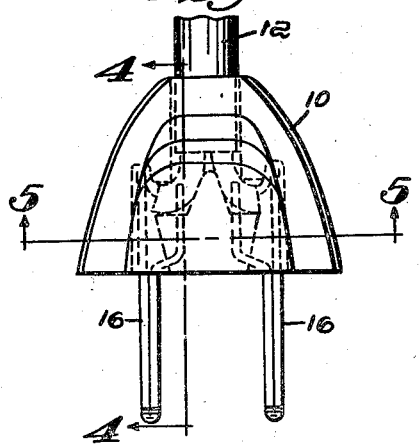
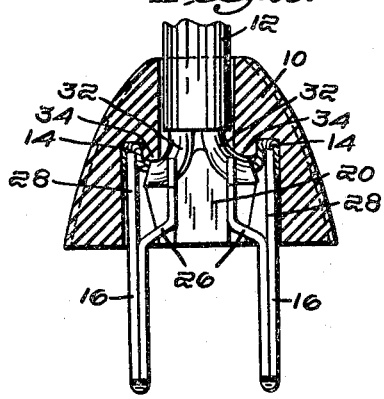
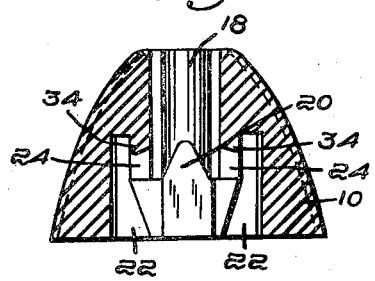
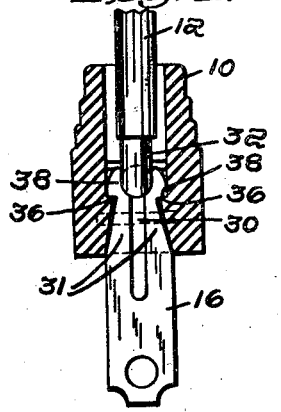
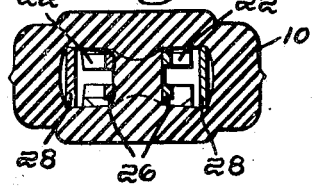
Inventor:
Frank D. Bryant,
by Thomson & Thomson
Attorneys Patented June 17, 1947

2,422,393

UNITED STATES PATENT OFFICE 2,422,393

ELECTRIC PLUG

Frank D. Bryant, Wethersfield, Conn., assignor to Royal Electric Company, Inc., Pawtucket, R. I., a corporation of Rhode Island Application November 17, 1945, Serial No. 629,290

6 Claims. (Cl. 173—361)

1

This invention relates to plugs commonly used to connect the conductors of electric lamps and other electric appliances to supply outlets or couplings, and the principal purpose of the invention is to provide improved means for electrically connecting the conductors to the ends of the blades, and for securing the blades and conductors within the housing.

The most common electric plug heretofore used is the familiar type in which the blades are secured within a two-part housing by screws, and the conductors are connected to the blades by additional screws; other plugs have the conductors soldered or clamped to the blades. In some cases, one piece housings of resilient material have been employed, in which saw tooth blades are pushed into the housing and against the conductors and held in engagement by impingement of the blade teeth in the recesses of the housing. All of these expedients require the use of tools in assembling the plugs, or the use of a special housing material; and the connections frequently loosen, thereby impairing the efficiency of the plug.

The principal advantages of the present invention are that any non-frangible material may be used for the housing material; positive retention of the blades within the housing is afforded; a good and durable electrical contact between the electrical conductor and the blades is provided; economies of manufacture are effected due to the small number of parts required; and firm anchorage of the cord to the housing, which is so important in resisting separation of the parts when the plug is pulled from the supply outlet, is ensured.

In the drawings,

Fig. 1 is an elevation of the assembled plug with internal parts shown in dotted lines;

Fig. 2 is a sectional view of the one-piece housing, with the conductor wires and blades in anchored position;

Fig. 3 is a similar view of the housing, with the conductors and blades removed;

Fig. 4 is a longitudinal section taken on line 4—4 of Fig. 1; and

Fig. 5 is a transverse section taken on line 5—5 of Fig. 1.

The housing 10 is preferably molded in one piece of thermo-setting, thermoplastic, or other suitable material, and contains a plurality of recesses or openings intended to receive a conductor 12 having a pair of insulated wires 14, and the ends of blades 16, in such a manner as to provide firm electrical contact between the blades and the bare ends of the wires and also to clamp the insulation of the wires within the housing. Recess 18 is shaped to accommodate the conductor 12, and is directed toward an interior wedge or partition 20, which is disposed between blade recesses or slots 22. The purpose of the wedge 20, which is preferably integral with housing 10, is to direct the respective wires into lateral passages 24 connecting the cable recess 18 with the blade slots 22. Each of the blades 16 is fabricated from brass sheeting or any other electrical conducting material, preferably doubled upon itself in such a way as to provide a straight, two-ply, outer prong for insertion into a conventional electrical supply outlet, and two spaced, inner arms 26 and 28 which are recessed in housing 10 and disposed in the complemental blade slot.

The inner arm 26 is slotted as shown at 30 (Fig. 4) to provide spring fingers 31, and the slot 30 has a circular mouth at the forked tip of the arm which exerts a clamping action on the wire insulation 32 when the insulated wire is engaged by said forked tip and pressed against a shoulder 34 of the housing. This clamping action is achieved by making the circular mouth of slot 30 smaller than the diameter of the insulated wire, to produce a spring grip between the tips of the resilient fingers 31; and by the decreasing taper of blade recess 22, as shown in Fig. 4, which tends to press the fingers together. Although the clamping grip afforded by either of these two structural features would be sufficient, both are recommended as a preferred arrangement for optimum security.

Another important purpose of the decreasing taper of bayonet recess 22 is to form interior shoulders 36, which in conjunction with hooks 38 formed on the flexible fingers of the arm 26, provide a positive locking action between the blade arm 26 and the housing 10, when the hooks are snapped over the shoulders 36 upon insertion of the blade. Besides retaining blade 16 in housing 10, this locking action ensures a secure electrical contact between the bare end of conductor wire 14 and the tip of the blade arm 28 which is of such length that a longitudinal, compressing or clamping action is exerted on wire 14, thereby bending the wire over the arm tip and forcing it against the bottom of recess 22, behind shoulder 34, when the blade is locked in the housing.

The plug is assembled by inserting the conductor 12 in recess 18 until the insulated wires 14 are spread by the wedge 20 to occupy the respective passages 24, and then pressing the blade arms 26, 28 into the slots 22 until the locking hooks 38 snap over the housing shoulders 36, thereby permanently clamping the parts together with firm mechanical and electrical engagement between the conductors and the blades, and those parts and the one-piece housing in which they are contained.

I claim:

1. An electric plug comprising a housing having a conductor recess and a pair of blade-receiving slots, a conductor having a pair of flexible, insulated wires entering said recess, the housing having lateral passages receiving the respective wires and leading to the respective slots, a pair of blades for attaching the plug to an outlet, each blade having a pair of spaced arms received in one of said slots, the outer arm engaging a bare wire end and clamping it against the housing, and the inner arm having a resilient, forked tip clamping the insulation of the wire, and means securing the blades within the housing and locking said arms in clamping position.

2. An electrical plug comprising a housing having a conductor recess and a pair of blade-receiving slots, a conductor having a pair of flexible, insulated wires entering said recess, the housing having lateral passages receiving the respective wires and leading to the respective slots, a pair of blades for attaching the plug to an outlet, each blade having a pair of laterally spaced arms received in one of said slots, the outer arm engaging a bare wire end and clamping it against the housing, and the inner arm having a resilient, forked tip clamping the insulation of the wire, the housing having a shoulder and the inner arm having a hook engaging over the shoulder to secure the blade within the housing and to lock said arms in clamping position.

3. An electric plug comprising a housing having a conductor recess and a pair of blade-receiving slots, a conductor having a pair of flexible, insulated wires entering said recess, the housing having lateral passages receiving the respective wires and leading to the respective slots, a wedge at the bottom of said recess for directing the wires into the respective passages upon insertion thereof into the housing, the sides of the wedge forming the inner walls of said slots, a pair of blades for attaching the plug to an outlet, each blade having a pair of laterally spaced arms received in one of said slots, the outer arm engaging a bare wire end and clamping it against the housing, and the inner arm having a resilient, forked tip clamping the insulation of the wire, and means securing the blades within the housing and locking said arms in clamping position.

4. An electric plug comprising a one-piece housing having a conductor recess at one end, a pair of blade-receiving slots at its other end, and lateral passages between said recess and the respective slots, a conductor received in said recess and having a pair of insulated wire disposed in the respective passages with the bared ends of the wires extending into the bottom of said slots, means within the plug for directing the wires into said passages when inserted endwise into said recess, a pair of blades having prongs for attaching the plug to an outlet, each blade having a pair of laterally spaced, resilient arms received in one of said slots, the tip of the outer arm engaging a wire end and clamping it against the housing, and the inner arm having a pair of spring fingers engaging the insulated wire and clamping it against the housing, and means securing the blades within the housing and locking said arms in clamping position.

5. An electric plug comprising a one-piece housing having a conductor recess at one end, a pair of blade-receiving slots at its other end, and lateral passages between said recess and the respective slots, a conductor received in said recess and having a pair of insulated wires disposed in the respective passages with the bared ends of the wires extending into the bottom of said slots, a partition integral with the housing and forming the inner walls of said slots, the partition having a wedge portion disposed in line with said cable recess for directing the wires into said passages when inserted endwise into said recess, a pair of blades having prongs for attaching the plug to an outlet, each blade having a pair of laterally spaced, resilient arms received in one of said slots, the tip of the outer arm engaging a wire end and clamping it against the housing, and the inner arm having a pair of spring fingers engaging the insulated wire and clamping it against the housing, and means securing the blades within the housing and locking said arms in clamping position.

6. An electric plug comprising a one-piece housing having a conductor recess at one end, a pair of blade-receiving slots at its other end, and lateral passages between said recess and the respective slots, a conductor received in said recess and having a pair of insulated wires disposed in the respective passages with the bared ends of the wires extending into the bottom of said slots, a partition integral with the housing and forming the inner walls of said slots, the partition having a wedge portion disposed in line with said cable recess for directing the wires into said passages when inserted endwise into said recess, a pair of blades having prongs for attaching the plug to an outlet, each blade having a pair of laterally spaced, resilient arms received in one of said slots, the tip of the outer arm engaging a wire end and clamping it against the housing, and the inner arm having a pair of spring fingers engaging the insulated wire and clamping it against the housing, opposite walls of each blade slot tapering inwardly toward each other, and having a pair of opposed shoulders at the ends thereof, and the fingers of each inner arm having outwardly projecting hook portions engaging over said shoulders with a snap action when the blades are forced into said slots, thereby permanently to secure the blades within the housing and to lock said arms in clamping position.

FRANK D. BRYANT.